US009425857B2

(12) United States Patent
Sharfer

(10) Patent No.: US 9,425,857 B2
(45) Date of Patent: Aug. 23, 2016

(54) METHOD AND DEVICE FOR SECURED SHARING OF SIGNALS FOR CROSSTALK CANCELLATION

(71) Applicant: ECI TELECOM LTD., Petach Tikva (IL)

(72) Inventor: Ilan Sharfer, Rehovot (IL)

(73) Assignee: ECI TELECOM LTD., Petach Tikva (IL)

( * ) Notice: Subject to any disclaimer, the term of this patent is extended or adjusted under 35 U.S.C. 154(b) by 176 days.

(21) Appl. No.: 13/959,236

(22) Filed: Aug. 5, 2013

(65) Prior Publication Data
US 2014/0036654 A1 Feb. 6, 2014

(30) Foreign Application Priority Data
Aug. 5, 2012 (IL) .......................................... 221302

(51) Int. Cl.
*H04B 3/32* (2006.01)
*H04B 3/46* (2015.01)
*H04B 3/487* (2015.01)

(52) U.S. Cl.
CPC .................. *H04B 3/32* (2013.01); *H04B 3/464* (2013.01); *H04B 3/487* (2015.01)

(58) Field of Classification Search
CPC ........................................................ H04B 3/32
See application file for complete search history.

(56) References Cited

U.S. PATENT DOCUMENTS

| | | | |
|---|---|---|---|
| 6,748,016 B1* | 6/2004 | Tzannes ......................... | 375/227 |
| 8,442,099 B1* | 5/2013 | Sederat ..................... | H04B 3/30 |
| | | | 375/219 |
| 2005/0075845 A1* | 4/2005 | Thomas .................. | G01S 19/21 |
| | | | 702/189 |
| 2008/0232233 A1* | 9/2008 | Spirkl et al. .................. | 370/201 |
| 2010/0039923 A1* | 2/2010 | Kim ......................... | H04B 3/23 |
| | | | 370/201 |
| 2010/0195478 A1* | 8/2010 | Schenk et al. ................ | 370/201 |
| 2010/0329444 A1* | 12/2010 | Ashikhmin et al. ...... | 379/406.06 |
| 2011/0150057 A1* | 6/2011 | Anschutz et al. ............. | 375/222 |

* cited by examiner

*Primary Examiner* — Brian D Nguyen
*Assistant Examiner* — Toan Nguyen
(74) *Attorney, Agent, or Firm* — Browdy and Neimark, PLLC

(57) ABSTRACT

A method is described for reducing interferences in communications exchanged along a plurality of communication channels operated by a first operator, caused by one or more alien communication channels operated by a second operator. The method comprises the steps of: (i) providing the second operator with information that relates to interferences experienced at the plurality of communication channels operated by a first operator, due to traffic conveyed along alien communication channels operated by the second operator; (ii) modifying the original signals conveyed by the second operator along the alien communication channels; (iii) sending the modified signals to the first operator; and (iv) applying the modified signals by the first operator to reduce interferences in communications exchanged along the plurality of communication channels and operated by the first operator.

14 Claims, 1 Drawing Sheet

METHOD AND DEVICE FOR SECURED SHARING OF SIGNALS FOR CROSSTALK CANCELLATION

CROSS-REFERENCE TO RELATED APPLICATIONS

This application claims priority of Israel Patent Application No. 221302, filed Aug. 5, 2012, the disclosure of which is incorporated by reference herein in its entirety.

TECHNICAL FIELD

The field of the present invention relates in general to telecommunications and particularly to solving the problem of interferences experienced in access communications networks.

BACKGROUND

Digital Subscriber Lines (DSL) technology has been developed to increase the effective bandwidth of existing subscriber line connections. One of the primary factors limiting the bandwidth, or channel capacity, of any typical access network making use of an x-DSL protocol such as G.Lite, ADSL, ADSL2, VDSL, VDSL2, SDSL, MDSL, RADSL, HDSL, etc, is noise, whether that noise is a result of echo, channel cross talk, impulse or background sources. Thus, efforts are being made to minimize the various noise sources.

One attempt constantly being made is to minimize crosstalk between subscribers' lines caused by the topology of the telephone cables themselves, since telephone subscriber loops are typically organized in binders with a number of twisted pairs, each sharing a common physical or electrical shield in a cable. Due to capacitance and inductive coupling, the phenomenon of cross-talk occurring between twisted pairs is experienced even though the pairs are well insulated for DC.

Nowadays, network operators begin to deploy advanced modems based on the VDSL2 technology in order to provide higher data rates to their end users. Theoretically, the data rates can go beyond 100 Mbs and may even reach 300 Mbps on very short loops. However, in practice there exists the phenomenon of crosstalk which occurs between twisted pairs that are physically close to each other, for example twisted pairs that are located in the same cable binder. This impairment severely restricts the maximal achievable data rate that can be conveyed along a certain line, because the simultaneous transmissions along adjacent lines inevitably result in that the lines create a high level of noise. This crosstalk induced noise, reduces significantly the maximum achievable data rates.

In order to eliminate the impact of crosstalk, operators began to employ crosstalk cancellation techniques, also known as vectoring. This technique provides means for cancelling the crosstalk noise between lines, provided that signals from all lines are processed jointly as a vector at one central location, for example at a DSLAM located at the street cabinet or at the central office of the network operator. As long as all VDSL2 lines in one cable are terminated and processed in a single DSLAM, the crosstalk interference can be significantly reduced by the use of vectoring technique.

However, a major problem arises in situations where crosstalking VDSL2 lines are terminated on different DSLAMs, operated by different network operators. According to the sub-loop unbundling ("SLU") regulation, in order to increase competition and encourage the delivery of advanced broadband services at a lower cost to the user, it must be allowed for new operators to deploy their equipment in the cabinet adjacent to the equipment of the incumbent operator. Now, let us consider a case where two VDSL2 lines that previously were terminated at a single DSLAM and therefore could be vectored, as opposed to two VDSL2 lines that are terminated at different DSLAMs managed by different operators. In the latter case, these lines cannot be vectored and consequently, crosstalk cancellation between lines sharing the same physical cable but terminated at different DSLAMs is not possible. A possible remedy to this problem is to carry out "cable management" procedure, which is a very costly operation that requires re-wiring of lines so as to ensure that all lines located along one physical cable are routed to one single DSLAM, thereby enabling the application of crosstalk cancellation by performing vectoring procedure on these lines. However, cable management is clearly not a preferred option by the operators. Another option is to simply suffer the performance loss caused by crosstalk by non-accessible VDSL2 lines, also called alien crosstalk, and be content by the vectoring performance gains from cancellation of the in-domain crosstalk. Studies show that usually the performance gains from in-domain crosstalk cancellation alone, are significantly reduced compared with those where alien crosstalk can be cancelled, hence the economical benefit to the operators using vectoring techniques diminishes.

One of the major barriers to performing alien crosstalk cancellation between DSLAMs operated by different operators is that it is necessary that one operator, say operator 1, sends the signals that it transmits through DSLAM 1 on its VDSL2 lines to another operator, say operator 2, so that these signals could be vectored with the other signals transmitted on DSLAM 2. By doing that, DSLAM 2 is now able to cancel crosstalk originating from VDSL2 lines attached to DSLAM 1. However, the problem is that operators are strongly reluctant to provide other operators with copies of the signals which they convey at their own networks. Therefore, in the above case, even though operator 1 realizes the benefit of using the vectoring technique if provided with copies of the signals transmitted by operator 2, would still be averse to reciprocate by providing operator 2 with copies of its own signals in order to maintain the privacy of signals transmitted through DSLAM 1, and will refrain from providing these signals to the other operator. Obviously, the same applies in the opposite direction where operator 2 would refrain from providing copies of the signals transmitted through DSLAM 2 to operator 1. Therefore, these signals cannot be vectored at DSLAM 1 and the crosstalk which they create and adversely affect lines at DSLAM 1 cannot be cancelled.

SUMMARY OF THE DISCLOSURE

In order to solve the above-described problems, one of the objects of the present invention is to provide a method that allows each operator to share its own signals with other operators in a secured way, so the other operator can vector the signals thus received for carrying out crosstalk cancellation.

Another object of the present invention is to prevent the operator receiving the information to reverse engineer that information in order to retrieve the original signals of the operator sending this information.

Yet another object of the invention is to provide a secured method where both operators participating in the exchange of information are allowed to carry out the crosstalk cancellation procedure and send the information required for the other operator, in a secured way.

Other objects of the invention will become apparent as the description of the invention proceeds.

Therefore, according to one embodiment, a method is provided for reducing interferences in communications exchanged along a plurality of communication channels operated by a first operator, wherein these interferences are caused by one or more alien communication channels operated by at least one other operator (i.e. at least one second operator), wherein the method comprises the steps of:

(i) providing the second operator with information that relates to interferences experienced at the plurality of communication channels operated by a first operator, due to the traffic conveyed along the one or more alien communication channels operated by the second operator;

(ii) modifying the original signals (e.g. by adding one or more signals to the original signals) conveyed by the second operator along the one or more alien communication channels, thereby creating a modified signal;

(iii) sending the modified signal to the first operator; and (iv) applying the modified signal by the first operator to substantially reduce interferences in communications exchanged along the plurality of communication channels and operated by the first operator, that are caused by the one or more alien communication channels operated by the second operator.

The term "street cabinet" as used herein throughout the specification and claims relates to any location where there is a physical proximity between the media (e.g. copper wires) conveying the signals which is owned by one operator, and media conveying the signals which is owned by another operator. Thus, the term "street cabinet", as used herein denotes apart from a street cabinet, also central office, two or more adjacent DSLAMs and the like, and should be understood as such for understanding the scope of the present invention.

The term "alien communication channels" as used herein throughout the specification and claims should be understood to encompass communication channels (e.g. copper wires) which are used to convey traffic by an operator different from another operator that conveys traffic along the plurality of communication channels, and that other operator requires to receive information from the operator of the alien channel(s) in order to properly carry out a crosstalk cancellation procedure for signals conveyed along its plurality of communication channels.

Although the invention described herein through the specification and claims relates mainly to solving a problem arising from the operation of two operators, still, as would be appreciated by those skilled in the art, there could be more than two operators having adjacent equipment which cause interferences to each other. The solution described herein is also applicable to the such a scenario mutates mutandis, where each pair of operators of the more than two operators, may act to reduce the interference existing therebetween as if the other operators do not exist, and then each operator of that pair may repeat the same solution with one of the other operators, until each operator resolves the problem with each of the other operators.

Also, although the invention described herein through the specification and claims relates a solution where two (or more) operators communicate directly between themselves by exchanging directly information required to the reduction of crosstalk interferences, it should be understood that the scope of the present invention also encompasses scenarios where each of the two (or more) operators forwards the required information to a third party which will preferably carry out the mathematical manipulations required, and will provide each of the operators with the proper instructions on how to cancel the crosstalk for their own traffic carrying channels.

According to another embodiment, the one or more signals added to the original signals by the second operator, is a vector which is orthogonal to the respective crosstalk cancellation coefficients' vector, where the respective crosstalk cancellation coefficients' vector is the corresponding crosstalk cancellation coefficients' vector used by the first operator.

By yet another embodiment, the information provided to the second operator is the crosstalk cancellation vector which relates to interferences experienced at the plurality of communication channels operated by a first operator due to the traffic conveyed along the one or more alien communication channels operated by the second operator.

In accordance with still another embodiment, the information provided to the second operator is one or more linear combinations of one or more crosstalk cancellation vectors which relate to interferences experienced at the plurality of communication channels operated by a first operator due to the traffic conveyed along the one or more alien communication channels operated by the second operator.

According to another embodiment, the information provided to the second operator is a set of M vectors which are all orthogonal to the crosstalk cancellation vector. Preferably, the second operator is provided with such a garbling basis, and the method further comprising a step of selecting, by the second operator, a linear combination of the basis vectors to generate the vector of one or more signals to be added to the original signals conveyed by the second operator along the one or more alien communication channels.

In accordance with another aspect there is provided a communication apparatus configured to enable reducing interferences in communications exchanged along a plurality of communication channels that are caused by one or more alien communication channels, and wherein the communication apparatus comprises:

(i) a receiver operative to receive information that relates to interferences experienced by the plurality of communication channels, due to traffic conveyed along the one or more alien communication channels;

(ii) a processor operative to modify original signals conveyed along the one or more alien communication channels, and wherein the modified signals are adapted to enable, when applied to communications exchanged along the plurality of communication channels, to substantially reduce interferences therein that are caused by the one or more alien communication channels; and (iii) a transmitter operative to send the modified signals so that they can be applied to communications exchanged along the plurality of communication channels.

According to another embodiment of this aspect, the processor is operative to modify the original signals by adding one or more signals to the original signals conveyed along the one or more alien communication channels, thereby creating the modified signal.

By another embodiment, the one or more signals added to the original signals, is a vector which is orthogonal to the respective crosstalk cancellation coefficients' vector.

In accordance with still another embodiment, the information received by the receiver is a crosstalk cancellation vector which relates to interferences experienced at the plurality of communication channels due to the traffic conveyed along the one or more alien communication channels.

By yet another embodiment, the information received by the receiver is one or more linear combinations of one or more crosstalk cancellation vectors which relate to interferences experienced at the plurality of communication channels due to the traffic conveyed along the one or more alien communication channels.

According to another embodiment of this aspect of the invention, the information received by the receiver is a set of M vectors which are all orthogonal to the crosstalk cancellation vector.

In accordance with still another embodiment, the receiver is provided with a garbling basis of the set of M vectors, and wherein the processor is further operative to select a linear combination of the basis vectors and to generate a vector of one or more signals to be added to the original signals conveyed along the one or more alien communication channels.

BRIEF DESCRIPTION OF THE DRAWINGS

A better understanding of the present invention is obtained when the following non-limiting detailed description is considered in conjunction with the following drawings in which.

DETAILED DESCRIPTION OF THE INVENTION

Reference will now be made in details to an implementation consistent with some embodiments of the present invention as illustrated in the accompanying drawings.

Figure 1:
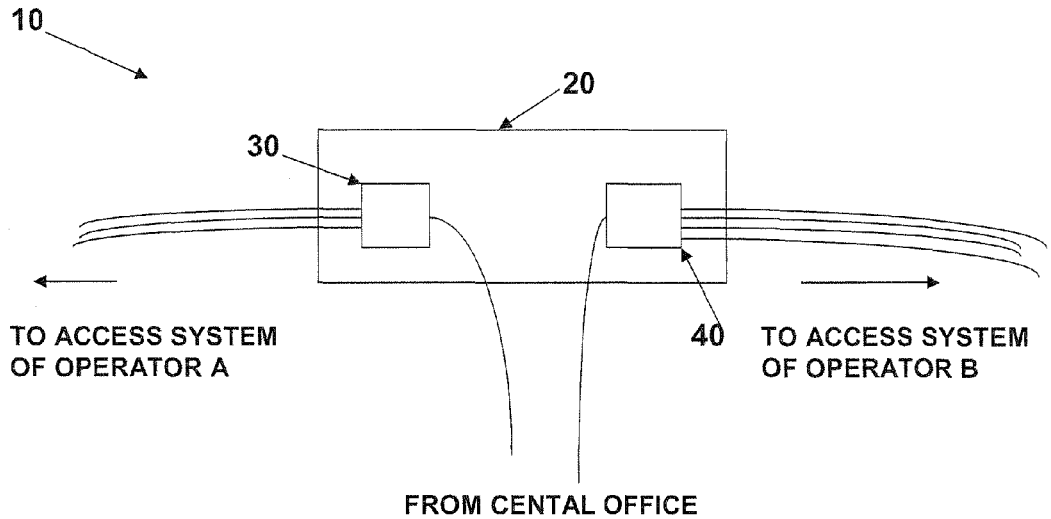
FIG. 1 illustrates a system configuration in which an embodiment of the present invention is carried out.

Let us consider now a non-limiting example of a method carried out in accordance with an embodiment of the present invention as depicted in FIG. 1. By this example, network 10 comprises a street cabinet 20 in which two digital subscriber line access multiplexers (DSLAMs) are installed. First, DSLAM 30 was installed by operator A and later on, an additional DSLAM (40) was installed in that street cabinet, this time by operator B. Upon commissioning DSLAM 40, it turned out that the communications that pass via DSLAM 30 are now suffering from degraded quality due to the crosstalk induced by the lines that reach DSLAM 40, while the performance of the lines reaching DSLAM 40 also suffer from crosstalk induced by lines that reach DSLAM 30.

In order to cancel this crosstalk, each of the operators should know the signals being conveyed via the DSLAM of the other operator. However, getting this information is not a straight forward process, as all operators are very determined not to provide other operators with copies of the traffic (signals) that they transfer in order not to breach the privacy of their customers (while the other operator has no obligation for maintaining the privacy of these customers).

Therefore, the solution provided by an embodiment of the present invention is that when the first operator provides the second operator with information that relates to interference being experienced at links operated by the first operator due to traffic conveyed by the second operator, this information will subsequently be applied by the second operator to derive an additional signal, unknown to the first operator (the recipient), that was added to the original signal of the second operator (the sender). This modified signal which is sent from the second operator to the first operator is also referred to herein as garbled (distorted) signal. The garbled signal is selected by the sender in such a way that the use of this signal by the recipient will cause the same effect of crosstalk cancellation as if the original (source) signal itself was made available to the first operator. Yet, it is impossible for the recipient to retrieve the original signal of the sender from the given garbled signal, which is preferably generated by summing the original signal with a special unknown signal.

Figure 2:
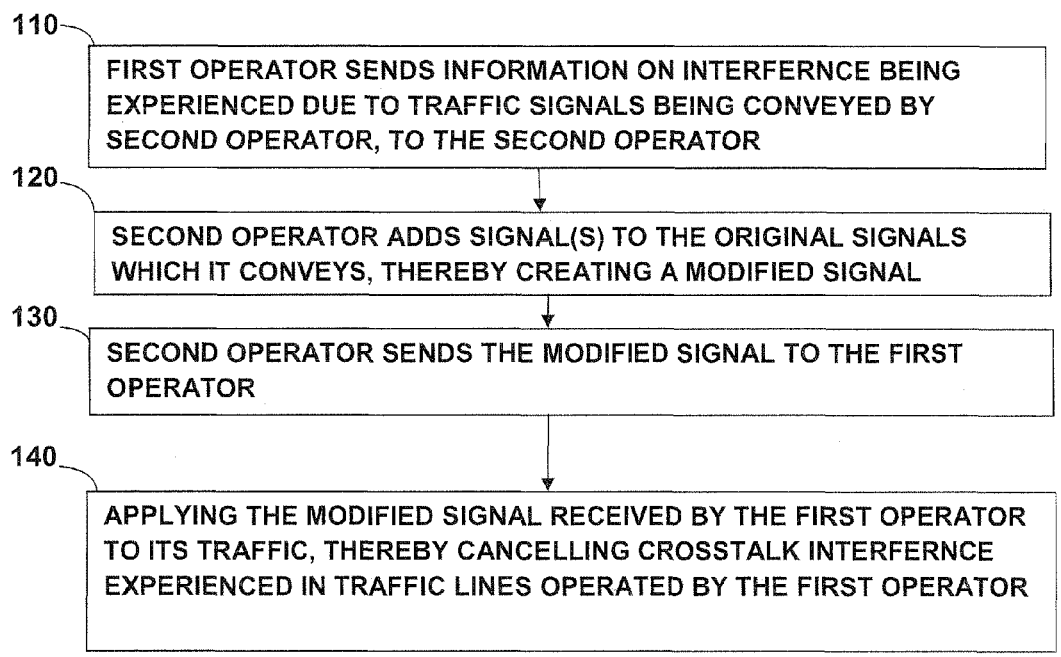
FIG. 2 demonstrates a method for carrying out an embodiment of the present invention.

FIG. 2 demonstrates an example of a method for reducing interferences in communications exchanged along a plurality of communication channels extending via a first DSLAM operated by a first operator, wherein the interferences are caused by one or more alien communication channels extending via a second DSLAM co-located with the first DSLAM and operated by a second operator.

According to this example, the first operator sends to the second operator information that relates to interferences experienced at the plurality of communication channels operated by itself due to the traffic conveyed along the one or more alien communication channels operated by the second operator (step 110). Upon receiving the information, the second operator adds one or more signals to the original signals it conveyed along the one or more alien communication channels, thereby creating a modified signal (step 120). The second operator then sends the modified signal to the first operator (step 130), and upon receiving the modified signal, the first operator applies the modified signal to substantially cancel the crosstalk experienced in communications exchanged along the plurality of its communication channels that are caused by the alien communication channels operated by the second operator (step 140).

In order to better understand the implementation of the method provided by the present invention, let us consider the following example.

The collection of signals sent along the VDSL2 lines are mathematically described by the following row vector $$\bar{x} = [x_1, x_2, \ldots, x_K]$$

Vector $\bar{x}$ has K components, where the parameter K denotes the number of VDSL2 lines. The complex-valued signal transmitted across line k is denoted by $x_k$ which is the k-th component of the vector $\bar{x}$. It is assumed that each of these K VDSL2 signals generates crosstalk to some victim line denoted by an index i. During the initialization of the vectoring system, the victim line learns the crosstalk that each of the K disturbing VDSL2 lines creates to it, and computes a set of complex-valued crosstalk cancellation vector coefficients:

$$\bar{p}_i = [p_{i,1}, p_{i,2}, \ldots, p_{i,K}]$$

When victim line i computes a vector product of the crosstalk cancellation vector $\bar{p}_i$ with the disturbing vector $\bar{r}$, and adds the result to its own transmitted or received signal, the crosstalk at line i is cancelled. The crosstalk cancelling signal for line i is mathematically described by the following formula:

$$s_i = \bar{x} \cdot \bar{p}_i^T = \sum_{k=1}^{K} x_k P_{i,k}$$

This is the principle of crosstalk cancellation as conventionally used in prior art solutions.

According to an embodiment of the present invention, the sender of signal $\bar{x}$ finds a garbling vector $\bar{g}$ which has the special property of being orthogonal to the crosstalk cancellation coefficients vector:

$$\bar{g} \cdot \bar{p}_i^T = 0$$

To securely share the vector $\bar{x}$ with the recipient, the sender adds the garbling vector g to x:

$$\bar{z} = \bar{x} + \bar{g}$$

Vector z is the garbled signal, and is the signal that will actually be shared by the sender and the recipient. Upon receiving vector $\bar{z}$, the recipient may initiate a crosstalk cancellation procedure, as it normally does:

$$u_i = \bar{z} \cdot \overline{p_i}^T = \sum_{k=1}^{K} z_k P_{i,k}$$

It may easily be shown that the signal $u_i$ is identical to the crosstalk cancellation signal $s_i$ due to the orthogonality between vector $\bar{g}$ and the crosstalk cancellation vector $p_i$:

$$u_i = \bar{z} \cdot \overline{p_i}^T$$
$$(\bar{x} - \bar{g}) \cdot \overline{p_i}^T - \bar{x} \cdot \overline{p_i}^T + \bar{g} \cdot \overline{p_i}^T$$
$$= s_i + 0 - s_i$$

In other words, the recipient of the garbled signal $\bar{z}$ is able to perform crosstalk cancellation as though the original signal $\bar{x}$ was made available to him, while the garbing vector $\bar{g}$, that was securely selected by the sender, remains unknown to the recipient, and it is therefore impossible for the latter to retrieve the original signal $\bar{x}$ from vector $\bar{z}$ which he had received.

However, in order to generate the garbling vector $\bar{g}$, the sender should possess the crosstalk cancellation vector $\overline{p_i}$ which is initially known to the recipient only. Therefore, vector $\overline{p_i}$ should be communicated by the recipient to the sender prior to the preparing the garbled signal $\bar{z}$ by the second operator (the sender). Sending this information from the first operator (the recipient of the garbled signal) to the second operator (the generator of the garbled signal) does not impose any breach of customers' privacy, as the crosstalk cancellation vector is not considered to be a private information of the recipient, therefore it could be shared with the sender.

According to an embodiment of the present invention, the recipient sends one or more linear combinations $\overline{q_i}$ of one or more crosstalk cancellation vectors $\overline{p_i}$ to the sender, instead of the vectors $\overline{p_i}$ themselves:

$$\overline{q_i} = L \cdot \overline{p_i}$$

where L is a non-singular matrix known only to the recipient. The sender can then find a garbling vector $\bar{g}$ as being orthogonal to $\overline{q_i}$. However, due to the properties of the linear combination it is bound to be orthogonal to $\overline{p_i}$:

$$\bar{g} \cdot \overline{q_i}^T = \bar{g} \cdot (L \cdot \overline{p_i})^T$$
$$= \bar{g} \cdot \overline{p_i}^T \cdot L^T$$
$$= 0$$

which implies that $\bar{g} \cdot \overline{p_i}^T = 0$ due to the properties of matrix L. Thus, according to this embodiment, even though the crosstalk cancellation vector $p_i$ itself is not disclosed to the sender, yet it is possible for the sender to send a garbled signal which can be used for crosstalk cancellation by the recipient.

In accordance with another embodiment, the recipient finds a set of M vectors which are all orthogonal to the crosstalk cancellation vector $\overline{p_i}$. There can be up to and including K−1 such vectors. These vectors are called the garbling basis, GB:

$$GB = \{\bar{g}_0, \bar{g}_1, \ldots, \bar{g}_{M-1}\}$$

The property of this set of vectors is that each vector belonging to the set, is orthogonal to $\overline{p_i}$. The recipient sends the garbling basis GB to the sender. The sender checks these vectors and if the result is satisfactory, it uses a linear combination of the basis vectors to generate the vector $\bar{g}$ as follows:

$$\bar{g} - \sum_{m=0}^{M-1} c_m \cdot \bar{g}_m$$

where the set of scalars $\{c_m\}$ is known only to the sender. Clearly vector $\bar{g}$ when generated as described above, is orthogonal to the crosstalk cancellation vector $\overline{p_i}$ and is not known to the recipient. By this embodiment, the crosstalk cancellation vector $\overline{p_i}$ is not disclosed to the sender.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow:

The invention claimed is:

1. A method for reducing interferences in communications exchanged along a plurality of communication channels operated by a first operator, wherein said interferences are caused by one or more alien communication channels operated by a second operator, said method comprising the steps of:
   (i) providing the second operator with information that relates to interferences experienced at the plurality of communication channels operated by a first operator, due to the traffic conveyed along the one or more alien communication channels operated by the second operator;
   (ii) modifying signals conveyed by the second operator in their original form along the one or more alien communication channels;
   (iii) sending the modified signals to the first operator; and
   (iv) applying the modified signals by the first operator to reduce interferences in communications exchanged along the plurality of communication channels and operated by the first operator that are caused by the one or more alien communication channels operated by the second operator.

2. The method of claim 1, wherein step (ii) of modifying the original signals comprises adding one or more signals to the original signals conveyed by the second operator along the one or more alien communication channels, thereby creating the modified signal.

3. The method of claim 2, wherein the one or more signals added to the original signals by the second operator, is a vector which is orthogonal to the respective crosstalk cancellation coefficients' vector.

4. The method of claim 1, wherein the information provided to the second operator is the crosstalk cancellation vector which relates to interferences experienced at the plurality of communication channels operated by a first operator due to the traffic conveyed along the one or more alien communication channels operated by the second operator.

5. The method of claim 1, wherein the information provided to the second operator is one or more linear combinations of one or more crosstalk cancellation vectors which relate to interferences experienced at the plurality of communication channels operated by a first operator due to the traffic conveyed along the one or more alien communication channels operated by the second operator.

6. The method of claim 1, wherein the information provided to the second operator is a set of M vectors which are all orthogonal to the crosstalk cancellation vector.

7. The method of claim 6, wherein the second operator is provided with a garbling basis of the set of M vectors, and the method further comprising a step of selecting by the second operator a linear combination of the basis vectors to generate a vector of one or more signals to be added to the original signals conveyed by the second operator along the one or more alien communication channels.

8. A communication apparatus configured to enable reducing interferences in communications exchanged along a plurality of communication channels operated by a first operator that are caused by one or more alien communication channels operated by a second operator, and wherein the communication apparatus comprises:
  (i) a receiver operative to receive, from the first operator, information that relates to interferences experienced by the plurality of communication channels, due to traffic conveyed along the one or more alien communication channels;
  (ii) a processor operative to modify original signals conveyed along the one or more alien communication channels, and wherein the modified signals are adapted to enable when applied to communications exchanged along the plurality of communication channels operated by the first operator, to substantially reduce interferences therein that are caused by the one or more alien communication channels; and
  (iii) a transmitter operative to send the modified signals so that they can be applied to communications exchanged along the plurality of communication channels.

9. The communication apparatus of claim 8, wherein said processor is operative to modify the original signals by adding one or more signals to the original signals conveyed along the one or more alien communication channels, thereby creating the modified signal.

10. The communication apparatus of claim 9, wherein the one or more signals added to the original signals, is a vector which is orthogonal to the respective crosstalk cancellation coefficients' vector.

11. The communication apparatus of claim 8, wherein the information received by the receiver is a crosstalk cancellation vector which relates to interferences experienced at the plurality of communication channels due to the traffic conveyed along the one or more alien communication channels.

12. The communication apparatus of claim 8, wherein the information received by the receiver is one or more linear combinations of one or more crosstalk cancellation vectors which relate to interferences experienced at the plurality of communication channels due to the traffic conveyed along the one or more alien communication channels.

13. The communication apparatus of claim 8, wherein the information received by the receiver is a set of M vectors which are all orthogonal to the crosstalk cancellation vector.

14. The communication apparatus of claim 13, wherein the receiver is provided with a garbling basis of the set of M vectors, and wherein the processor is further operative to select a linear combination of the basis vectors and to generate a vector of one or more signals to be added to the original signals conveyed along the one or more alien communication channels.

\* \* \* \* \*